United States Patent
Dreier

[11] 3,837,506
[45] Sept. 24, 1974

[54] STACK FORMER

[76] Inventor: Melvin E. Dreier, Dumont, Iowa 50625

[22] Filed: Sept. 14, 1973

[21] Appl. No.: 397,271

[52] U.S. Cl............................ 214/9, 56/344, 130/20
[51] Int. Cl............................................. B65g 57/00
[58] Field of Search.......... 100/233, 100; 56/1, 344, 56/346; 214/9, 58; 99/494; 130/20

[56] References Cited
UNITED STATES PATENTS

| | | | |
|---|---|---|---|
| 810,485 | 1/1906 | Gunn et al. | 130/20 |
| 2,932,299 | 4/1960 | Brandt et al. | 130/20 |
| 3,057,359 | 10/1962 | Schonert | 130/20 |
| 3,093,141 | 6/1963 | Sherver | 130/20 |
| 3,135,267 | 6/1964 | Liebig | 130/20 |
| 3,427,790 | 2/1969 | Flittie | 56/1 |
| 3,552,296 | 1/1971 | Flittie | 99/494 |
| 3,698,578 | 10/1972 | Flittie | 130/20 X |
| 3,703,966 | 11/1972 | Jones et al. | 214/9 |
| 3,771,673 | 11/1973 | Moeller | 214/9 X |

*Primary Examiner*—Billy J. Wilhite
*Attorney, Agent, or Firm*—Morton S. Adler

[57] ABSTRACT

A frame structure having a top and sides but no bottom or ends receives blown roughage materials such as corn and hay silage, dry hay, corn stalks and the like and serves as a form to create a stack of silage formed directly on the ground. The frame is wheel mounted at the sides with such sides being hinged at the top so that they can be moved outwardly at the bottom at an incline to the top for stack forming and can be in a vertical position for transportation through gates and over bridges and roads. Movement of the sides is preferably by hydraulic power and the axles of the wheels are rotatable 90° so the wheels can be properly oriented to the direction of movement of the sides when being extended or for forward travel. A baffle plate hingedly depends from the top between the sides to intercept blown roughage and cause it to fill the former which, when filled, can be pulled forwardly by a tractor with the baffle swinging up to ride over the top of the stack. The stack may be of any desired length and is uniform in shape.

10 Claims, 12 Drawing Figures

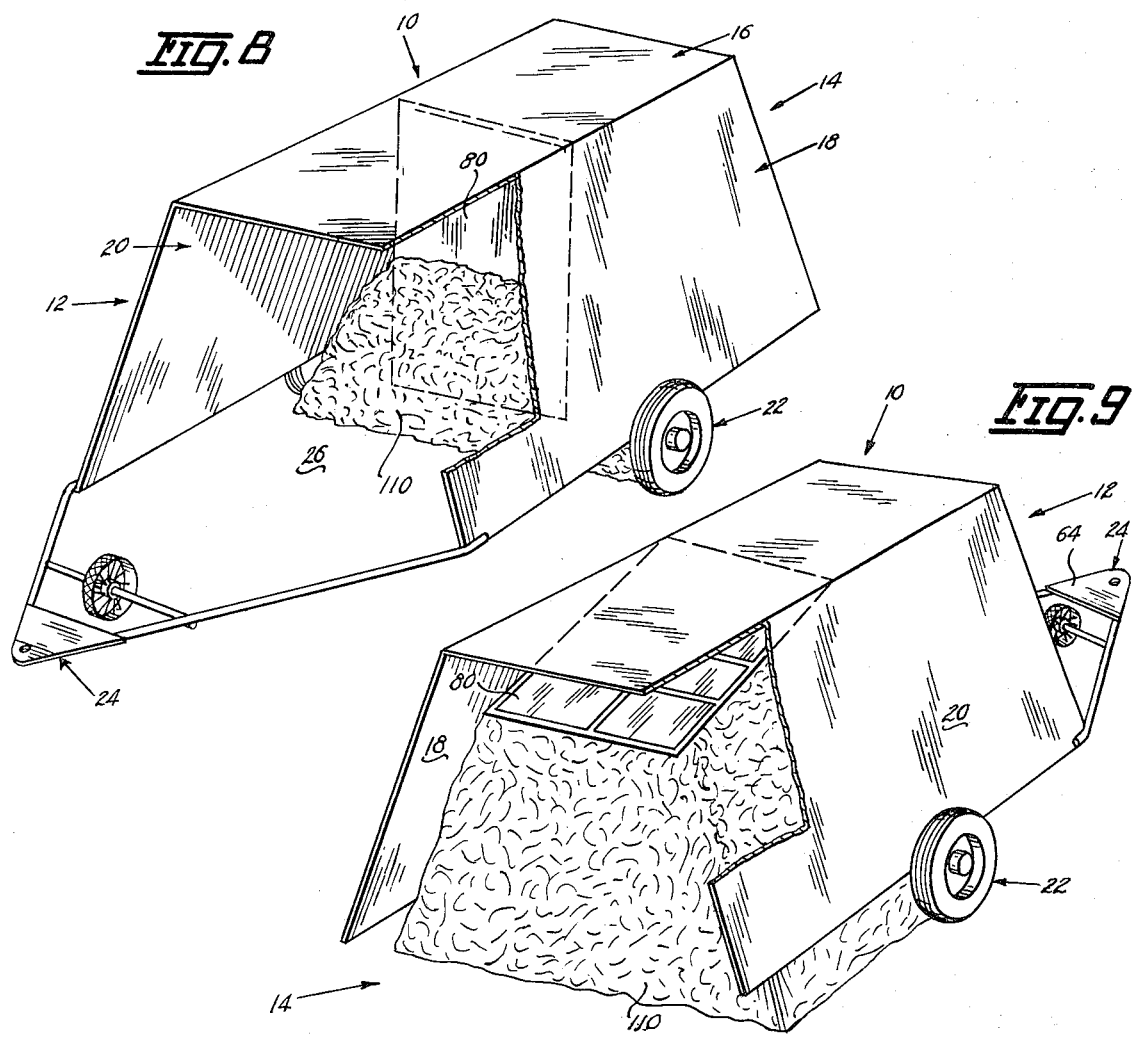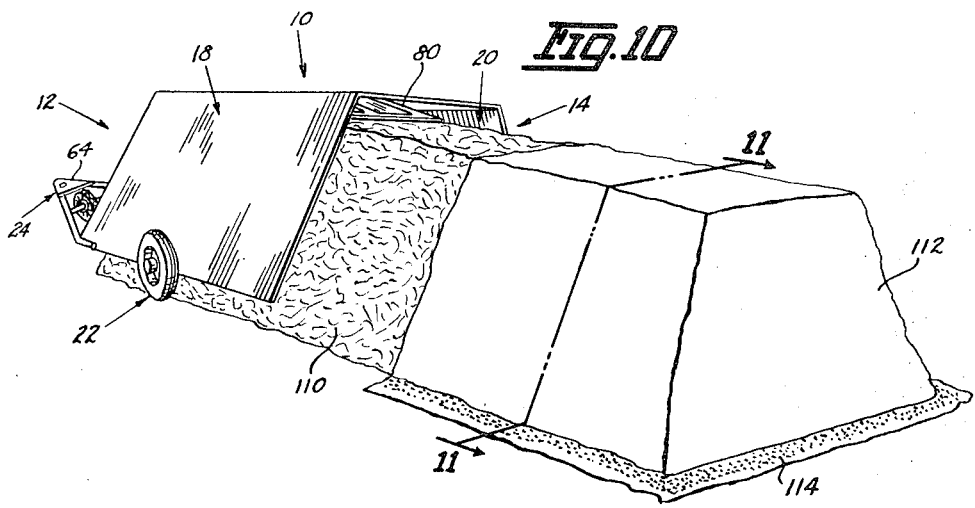

STACK FORMER

BACKGROUND OF THE INVENTION

This invention relates to a novel partially enclosed frame structure for receiving blown silage and causing it to be stacked on the ground in a predetermined uniform shape conducive to its preservation.

The value of ensilaging roughage materials to preserve the food value therein for animal feeds has long been recognized and practiced by the use of silos, pits or trenches and stacking on the surface of the ground. It is essential that the silage be sealed from the air as is well known and the storage in silos makes it possible to do this efficiently. However, when available silos are filled or in those situations where there may be no silos available, resort is had to the pit or surface stacking methods indicated. For this purpose, the silage, when it is cut, is loaded into forage wagons which are hauled to the stacking area, unloaded into a blower and blown into a stack formation. Wagon, tractor and blower equipment used is generally available on most farms or readily obtainable and is the same type of equipment used for filling silos.

A commonly practiced method of surface stacking is to create a generally large stack from the blower discharge so that an operator of a tractor provided with a loader or a dozer blade drives upon the stack to level and pack it for the purpose of making the stack as air tight as possible. While this is generally an effective packing procedure, it has the inherent disadvantage of being dangerous in that frequent accidents often including fatalities occur from tractors sliding off or tipping over the stack edges. Such stacks when formed and packed are sometimes covered with thin sheets or air impervious plastic and, otherwise, if adequately packed and shaped, will become sealed from the air by the surface layers becoming rotted and slimy to form a seal on the exposed surfaces.

One approach to surface stacking has been the use of certain elaborate equipment designed to encase the silage in an air tight capsule of plastic material as exemplified in U.S. Pat. Nos. 3,427,790 and 3,552,296 where it is pointed out that care must be taken in finally depositing or positioning the capsule so as to not disturb the ocnfiguration of the stack. Another endeavor in U.S. Pat. No. 3,698,578 discloses an elongated hollow structure having sides, top and bottom of a predetermined cross sectional configuration for receiving an inflow of silage to be first formed in a mass and then discharged onto the ground in the desired configuration where it is covered with an air impervious material. Such an arrangement has inherent possibilities of the stack disintegrating or crumbling while being discharged from the form structure and, accordingly, the presence of other and additional components are required to avoid such consequences.

With the above observations in mind, it is one of the important objects of the present invention to provide a simple but effective device for ensiling roughage materials at a selected ground area in a stack or mass of a pre-selected and uniform configuration.

More particularly, it is an object herein to provide a silage stack forming device of a selected shape having only a top and sides and being open at the bottom and ends and into which blown silage will accumulate directly on the ground in a mass or stack of the selected configuration.

A further important object is to provide a stack former as characterized which is wheel mounted and adapted to be towed whereby it may be moved progressively as it is filled to form a stack of any desired length.

Still another object is to provide a stack former of the above class which includes a depending swingable baffle to initially intercept the first blown silage to initiate the stack formation and which, when the former is towed forwardly, will swing upwardly to ride on the top of the formed stack and contribute to the packing of the same.

A still further object is to provide sides that are hinged at the top with power means to selectively move them outwardly at the bottom so as to be angularly disposed to establish sloping stack sides in the forming of the stack and to provide for their movement to a vertical position for purposes of narrowing the overall width of the former when being transported or moved through gates and over bridges and roads. Further, in this regard, it is another object to provide that the traveling wheels are mounted as supports for the movable sides and are susceptible of appropriate selective directional orientation to be operable whether the sides are being extended laterally or moved in a forwardly direction.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 5 is a cross sectional view taken from the line 5—5 of FIG. 3, FIG. 6 is a cross sectional view taken from the line 6—6 of FIG. 3, FIG. 8 is a front schematic perspective view of the stack former showing the beginning of an accumulation of forage forwardly of the baffle, FIG. 9 is a rear schematic perspective similar to the showing in FIG. 8 after the forward portion of the former has been filled and the former is moved forwardly where the baffle has swung to the top of the stack so that the forward area is ready to receive additional forage, FIG. 10 is a further schematic representation of the progressive positions of the former shown in FIGS. 8 and 9 to more particularly illustrate the stack fully started and partially covered witn an air impervious film after the former has again been moved progressively forwardly, FIG. 11 is a cross sectional view of the finished stack taken from the line 11—11 of FIG. 10, and FIG. 12 is a top plan view of a finished stack.

DESCRIPTION OF THE PREFERRED EMBODIMENTS

Figure 1:
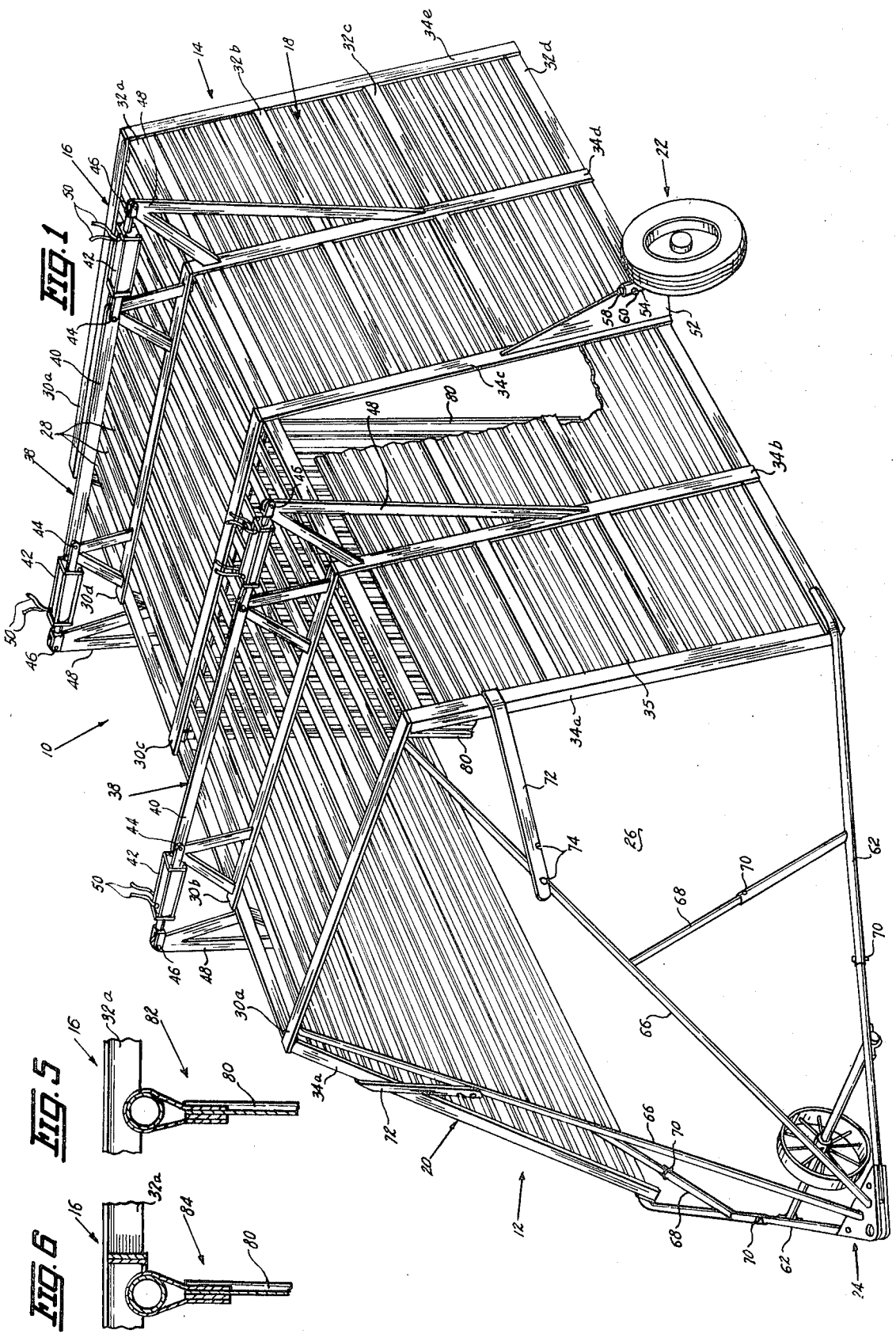
FIG. 1 is a perspective view of this stack former showing the sides extended in their position of use.
Figure 2:
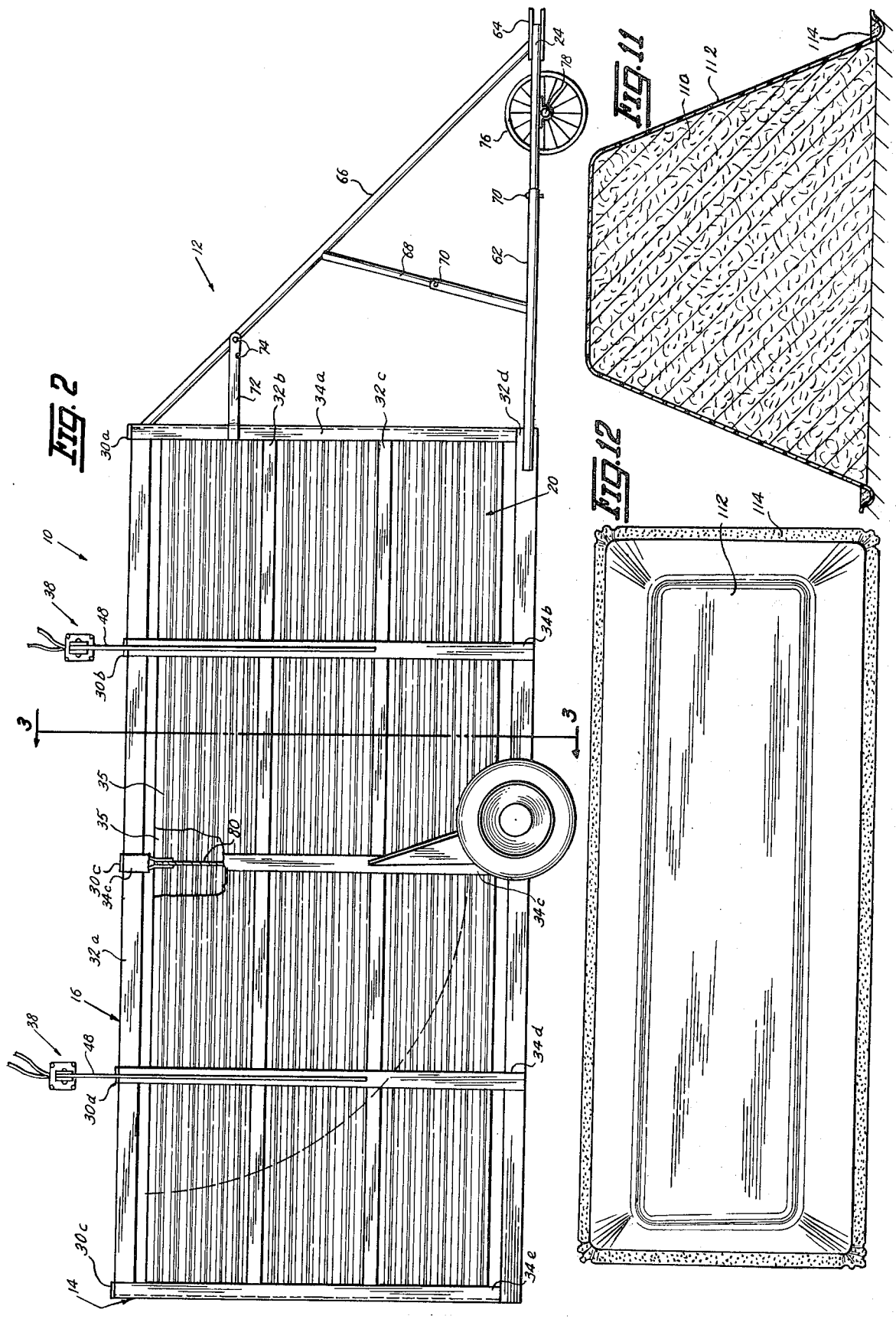
FIG. 2 is a side view thereof.

Referring to the drawings, this new stack former is designated generally by the numeral 10 as best seen in FIG. 1 and, for purposes of description, includes the forward end 12 and the rear end 14. Former 10 is, for all practical purposes, a mobil form characterized generally by a flat top 16, sides 18 and 20 depending from top 16, a ground engaging wheel 22 on each side, a forward tongue assembly 24 and with the forward 12 and rear 14 ends being open. Likewise, former 10 has no bottom so that this three sided form is in direct communication with the ground area 26 over which it is placed. Thus far identified, the several components of this former are more particularly described as follows.

Top 16 and sides 18 and 20 are respectively of a rectangular configuration and while they may be made in any desired manner and from any suitable material to provide a suitable form for effecting the accumulation of forage in the desired shape, I have preferably made top 16 in the form of a slatted panel comprising the elongated longitudinal spaced strips or slats 28 secured in place by a plurality of transversely arranged spaced like crosspieces 30a, 30b, 30c, 30d and 30e and these may be made from wood, metal or any other suitable material. The sides 18 and 20 which are of like construction so that like parts are given like numerals, define frame-like members comprising spaced longitudinal like rails 32a, 32b, 32c and 32d secured by spaced like crosspieces 34a, 34b, 34c, 34d and 34e with rail 32a being referred to as the top rail and rail 32d as the bottom rail. Crosspiece 34a will be referred to as forward end of sides 18 and 20 and crosspiece 34e as the rear end thereof. To the interior surface of each side 18 and 20, I have attached a sheet of corrugated metal 35 since this arrangement provides a suitable side closure which is sufficiently sturdy and yet relatively light in weight. However, it will be understood that any form of an enclosed side may be provided for the purposes herein intended.

Figure 3:
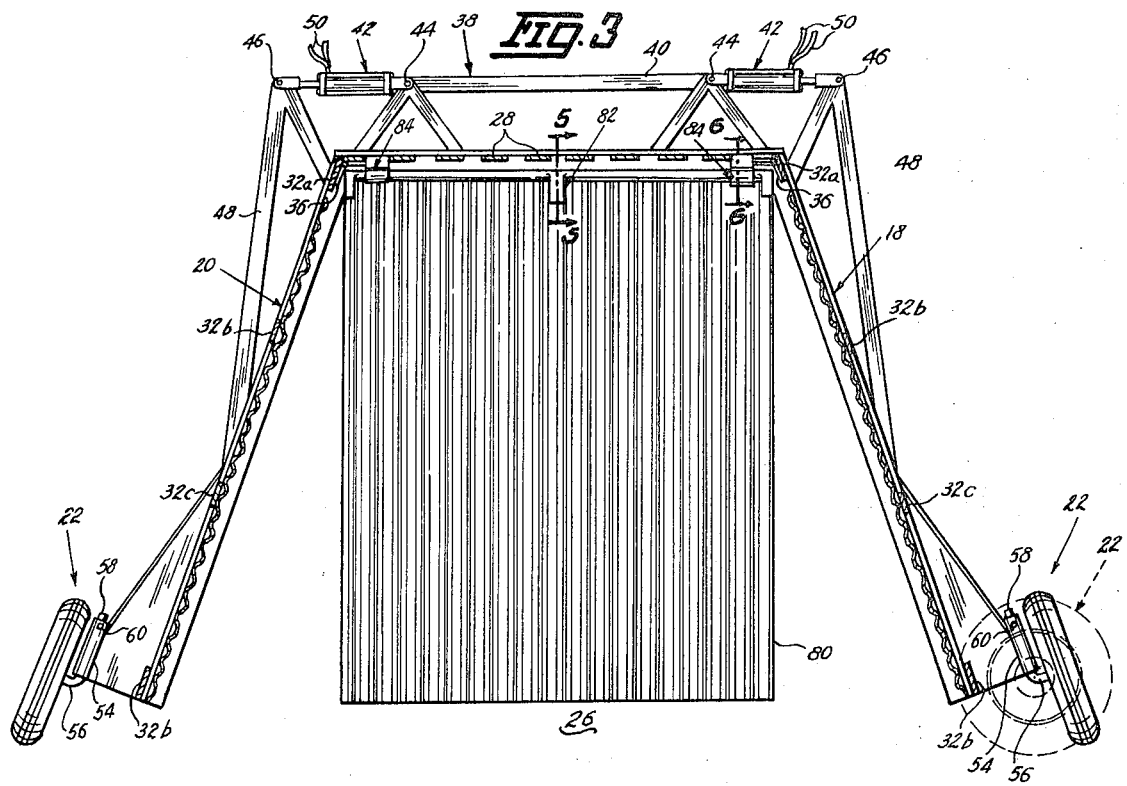
FIG. 3 is a cross sectional view taken on the line 3—3 of FIG. 1.
Figure 4:
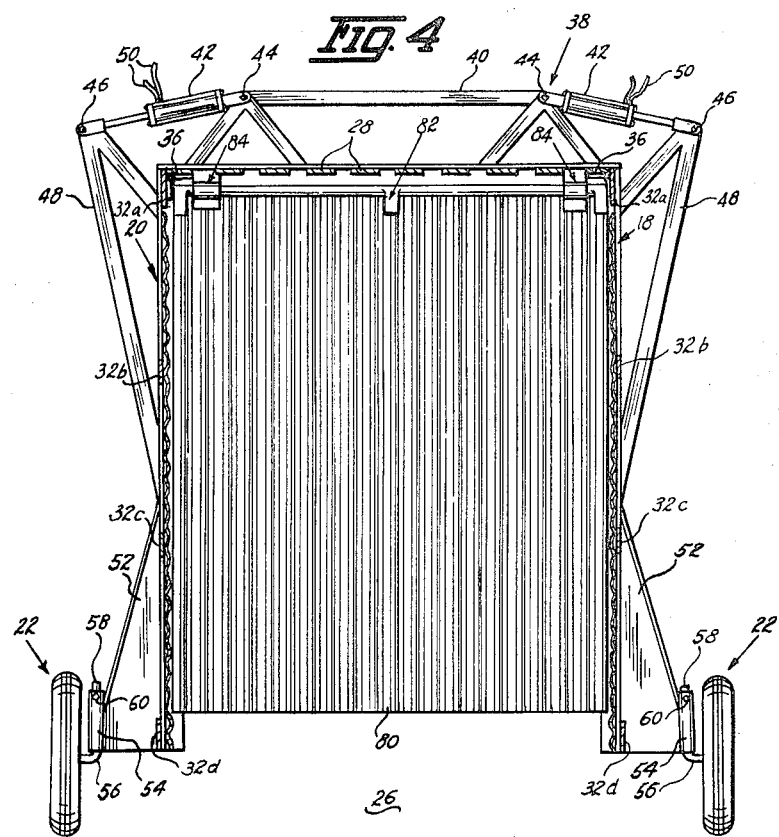
FIG. 4 is a cross sectional view similar to FIG. 3 but showing the sides retracted for transportation through gates or over roads and bridges.

The top rail 32a of each of the sides 18 and 20 is hingedly secured to one of the respective longitudinal edges of top 16 so that such sides depend therefrom as seen in FIG. 1 and to facilitate this arrangement, crospieces /34a–e on sides 18 and 20 are spaced similarly to the crospieces 30a–e on top 16 so that appropriate edges of such crosspieces can be placed in registering abutment and connected together by the respective hinges 36 as best seen in FIGS. 3 and 4 whereby the movement of such sides 18 and 20 toward and away from a vertical position is provided for as also seen in FIGS. 3 and 4. To effect such movement or swinging action of sides 18 and 20, I provide one or more like hydraulic assemblies designated generally by the numeral 38. Such assemblies 38 include suitable support bridging 40 secured transversely of top 16 to selected crosspieces thereon such as 30b and 30d and to each end of such bridging 40, one end of a two way hydraulic cylinder 42 is pivotally attached as at 44 with the opposite end of each cylinder extending outwardly above the top rails 32d where they are pivotally attached as at 46 to a respective brace member 48 secured to a corresponding crosspiece on the respective sides 18 and 20 such as crosspieces 34b and 34d. Appropriate hose lines 50 on the respective cylinders 42 will be connected in a well known manner to a source of hydraulic power on a towing vehicle as will be later referred to.

The wheels 22 are mounted relative to the bottom rail 32d of the respective sides 18 and 20 substantially midway between the forward crosspiece 34a and the rear crosspiece 34e and for this purpose, I have secured respective gussets 52 to the lower portion of crosspieces 34c and provided each gusset with the vertically disposed sleeve 54 as best seen in FIG. 4. The axles 56 for each wheel 22 include an integral upstanding arm 58 having an axis at 90° to axle 56 and such arm 58 is journalled in sleeve 54 where it can be selectively held against relative rotation therewith by any suitable means such as a set screw or removable pin 60. By this arrangement, selective rotation of arm 58 relative to sleeve 54 will orient wheels 22 either for forward movement as seen in FIG. 1 and the solid lines of FIGS. 3 and 4 or, as seen in the broken lines of FIG. 3, for travel perpendicular to a forward direction when the sides 18 and 20 are being moved laterally outwardly or inwardly relative to a vertical plane.

The tongue assembly 24 provides a convenient means for attaching former 10 to a suitable towing vehicle as will appear and is also designed to accommodate the retracted or extended positions of sides 18 and 20. For this purpose, a pair of like telescoping frame members 62 are connected at corresponding ends respectively to the forward ends of the bottom rails 32d from which they extend forwardly in a converging relationship for attachment to any suitable hitch plate 64. A pair of like brace rods 66 are connected at corresponding ends respectively to crosspiece 30a on top 16 near the respective ends thereof and extend forwardly and downwardly in a converging relationship for attachment to hitch plate 64. A further pair of like telescoping braces 68 extend between a respective frame member 62 and brace rod 66 as best seen in FIG. 1. It will be understood that the telescoping members 62 and 68 are a well known expedient having spring loaded latch means 70 for holding them in selected positions of adjustment and for which no invention per se is claimed. Thus far described, it will be appreciated that the telescopic members 62 and 68 will correspondingly extend and retract with the outward movement or extension and inward movement or retraction of sides 18 and 20.

As an added brace means for the tongue assembly 24, I provide the pair of like lock bars 72 which are secured respectively to a crosspiece 34a near top 16 and which extend forwardly and inwardly sufficiently to intersect and abut one of the brace rods 68. The free end portion of each bar 72 is provided with spaced undercut notches 74 for hooking engagement with rods 66 as shown in FIG. 1. A tongue support wheel 76 is mounted intermediate frame members 62 just rearwardly of the hitch plate 64 in any suitable manner such as by axle 78.

Within the interior of former 10 intermediate sides 18 and 20 I have placed a rectangular baffle or panel member 80 which is swingably depended from top 16 by any suitable hinge type assemblies 82 and 84 as best seen in FIGS. 5 and 6. Preferably, baffle 80 is substantially midway between ends 34a and 34e of sides 18 and 20 with assemblies 82 and 84 secured to crosspiece 34c in any suitable manner so as to extend to a point in close proximity to the ground when vertically disposed as seen in FIGS. 3 and 4. The purpose of baffle 80 as will be later explained in more detail, is only to provide temporary stop means for the blown forage as it is initially introduced into the former 10 and thus any baffle or panel structure sufficient for this purpose may be used. In the present invention, I have made baffle 80 in the form of a lightweight frame covered by corrugated sheet metal which is illustrated schematically in FIGS. 8, 9 and 10. While the overall size of former 10 may be a matter of choice, I have preferably made it, exclusive of the tongue assembly 24, approximately 20 feet long, 8 feet wide when the sides are retracted and some 10 feet high. The tongue section 24 will extend forwardly another 10 feet more or less. Accordingly, with former 10 constructed as described, it is used and operated as follows.

OPERATION

Former 10 can be towed by any suitable prime mover to its starting point where forage is to be stacked and for this purpose, the sides 18 and 20 will be retracted to a vertical position as seen in FIG. 4 so that it will easily negotiate bridges and gates and present as narrow an outline as possible if required to be moved over any roads.

Figure 7:
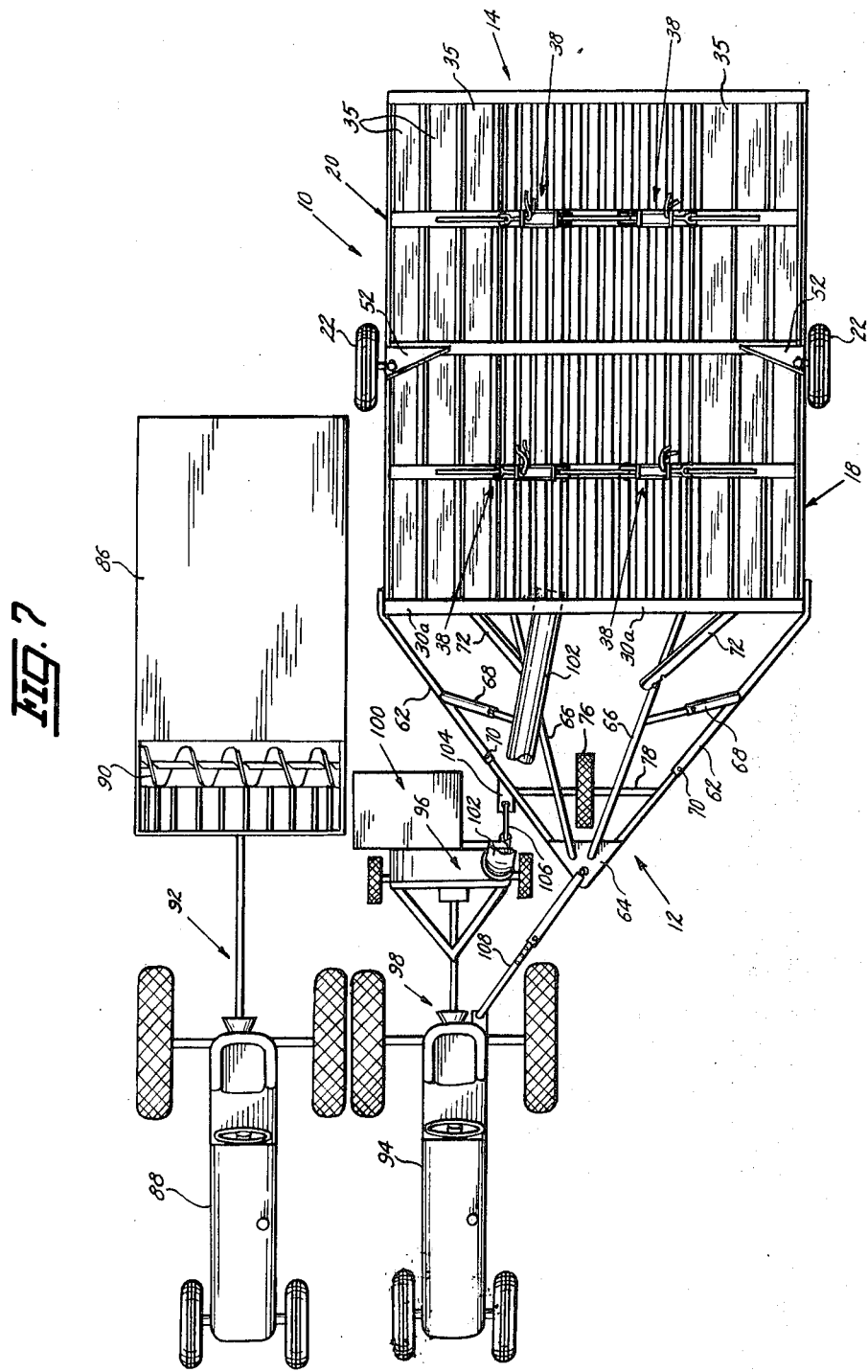
FIG. 7 is a top plan view showing the position of this stack former in use relative to a tractor hitched to both a blower unit and the former and a forage wagon hitched to a tractor as the forage supply source to be stacked.

With reference now to FIG. 7, former 10 is shown in relation to other equipment that will be employed in the formation of the forage stack. A forage wagon 86 pulled by a tractor 88 will have been loaded in the field with the forage and brought to the site for stacking. Such equipment as 86 and 88 is generally available on farms or readily obtainable and wagon 86 is of a common type which includes a forage discharge means such as the screw auger 90 connected to the power take-off 92 of tractor 88 in a well known manner. Alongside tractor 88 is a second tractor 94 to which is hitched a conventional type blower unit 96 operated by the power take-off 98 and includes a hopper 100 disposed alongside wagon 86 to receive the forage discharge whereby the forage is impelled by the blower 96 through spout 102 that may be directionally oriented as is well known.

Former 10, as seen in FIG. 7, is generally in an alongside position relative to wagon 86 although the front of the former proper represented by crosspieces 30a and 34a is spaced rearwardly of the hopper 100 so that the discharge end of spout 102 can be oriented to the interior of the former 10. It will be understood that prior to the stacking operations, former sides 18 and 20 will be extended as seen in FIG. 3 and for this purpose, wheels 22 are turned to the broken line position of FIG. 3 so that they will roll rather than drag as the hydraulic cylinders 42 are operated, such cylinders being operatively connected to tractor 94 in a well known manner. Once sides 18 and 20 are extended, wheels 22 are returned to their solid line position for forward movement when required as will appear.

Thus far described, it will be seen from FIG. 7 that because of the necessity to position blower 96 adjacent the auger end 90 of wagon 86 and due to the width of former 10, the hitch plate 64 is offset from a normal direct alignment with tractor 94 for a normal direct hitching attachment so that I have, accordingly, provided for such attachment as follows. On the frame member 62 of tongue 24 nearest wagon 86, I provide a rigid apertured plate 104 spaced rearwardly from the hitch plate 64 at approximately the point of attachment of axle 78 to receive a hitch bar 106 that connects in direct forward alignment to one end of the blower 96 frame in any convenient manner. Also, a telescopic rod hitch bar or rod 108 is connected on a diagonal from hitch plate 64 to the rear of tractor 94.

In starting the forage stack, baffle 80 will initially depend in a vertical plane to in effect provide a temporary back wall in former 10 and as forage is delivered from wagon 86 to blower 96 and discharged through spout 102, it is intercepted by baffle 80 whereby the stack begins to accumulate directly on the ground as represented by the numeral 110 in FIG. 8. Such accumulation continues with the size and shape of the stack determined by the interior configuration of the former 10 which preferably includes a narrower dimension across the top as compared with the bottom and with sloping sides made possible by the extension of sides 18 and 20.

When the area within former 10 forwardly of baffle 80 has been sufficiently filled, former 10 is pulled slowly forwardly by tractor 94 whereby baffle 80 swings upwardly to ride over the stack 110 as seen in FIG. 9 until it is substantially folded against top 16 but resting on the top of the stack and contributing to packing the same although such stack will be generally well packed if the blower 96 has suitable power. In the moving of former 10 forwardly as described, it has been noted from field tests and experiments that there may be an accumulation of forage at the bottom of sides 18 and 20 with the accumulation at side 20 adjacent wagon 86 tending to be heavier and over which wheels 22 must travel and in this regard, the more or less offcenter hitch connection arrangement afforded by hitch units 106 and 108 provides a most satisfactory means of maintaining the former 10 in proper travel alignment. As former 10 is successively filled and moved, the stack 110 will emerge as seen in FIG. 10 and may be continued for any length desired or may be discontinued at any point and restarted in a new location. The sloping stack sides minimize any sluffing away and, if desired, a thin sheet of air impervious material 112 such as plastic or the like can be used to cover the stack and weighted down in place around the edges by dirt filling 114 or other weighted material.

It has been successfully demonstrated in actual field operations that the present invention when made and used as described provides a most efficient and economical means for stacking forage at any selected field location in a row of uniform size and shape and of any desired length. The former 10 is relatively simple and uncomplicated yet economical to fabricate and highly efficient in producing a relative clean operation. In contrast to other so-called packaging or encapsuling devices or methods referred to above, the stack formed by this invention is at its final position on the ground when formed so that it does not have to be moved. Accordingly, from all of the foregoing, it is thought a full understanding of the construction and operation of this invention will be had and the advantages thereof appreciated.

I claim:

1. Apparatus to receive a stream of forcibly propelled forage and to constrain the same into an accumulated mass or form at a selected location and in a predetermined configuration, comprising:

a forage stack contraining form defined by an elongated flat top having parallel spaced longitudinal edges and respective panel-like sides secured to said respective edges in a depending relationship thereto, said form including respective open front and rear ends and an open bottom and adapted to be disposed over any selected surface area onto which a forage stack is to be placed and remain and with said front end oriented to receive the in-flowing forage, an elongated baffle member operatively secured at one end to said top within said form intermediate said front and rear ends so as to depend therefrom intermediate said sides, and said baffle member serving to intercept any in-flowing forage and causing it to accumulate on the surface area within said form in the configuration provided by said top and sides.

2. Apparatus as said baffle member to said top so that it is capable of a swinging movement relative thereto in a direction opposite to the direction of in-flowing forage.

3. Apparatus as defined in claim 1 including:
means hingedly connecting the respective sides to the respective longitudinal edges of said top, and
means mounted to said top and operatively connected to said respective sides for moving said sides on said hinge means whereby said sides can be laterally extended outwardly at the bottom a predetermined distance to present a form configuration having a flat top and downwardly and outwardly sloping sides.

4. Apparatus as defined in claim 3 including:
ground engaging wheels including a mounting attaching a respective wheel at respective opposed points on each side intermediate the front and rear thereof, and
means on said wheel mounting to permit of wheel orientation of 90° away from a direction of forward movement whereby said wheels are functional in ground engagement at such time as said sides are being laterally extended.

5. Apparatus as defined in claim 1 including:
means hingedly connecting said baffle member to said top so that it is capable of a swinging movement relative thereto in a direction opposite to the direction of in-flowing forage,
means hingedly connecting the respective sides to the respective longitudinal edges of said top,
means mounted to said top and operatively connected to said respective sides for moving said sides on said last mentioned hinge means whereby said sides can be laterally extended outwardly at the bottom a predetermined distance to present a form configuration having a flat top and downwardly and outwardling sloping sides,
ground engaging wheels including a respective mounting means attaching a respective wheel to respective sides at opposed points thereon intermediate the front and rear thereof, and
means on said wheel mounting means to permit of wheel orientation of 90° away from a direction of forward movement whereby said wheels are functional in ground engagement at such time as said sides are being laterally extended.

6. Apparatus as defined in claim 1 including:
means hingedly connecting said baffle member to said top so that it is capable of a swinging movement relative thereto in a direction opposite to the direction of in-flowing forage and upwardly towards said top,
a hitch means operatively secured to the front end of said form and adapted for connection to a prime mover, and
when the intercepted forage has accumulated within said form to the desired mass, said form being movable by the prime mover in a forwardly direction whereby said baffle member swings rearwardly and upwardly to rest and ride upon the top of the mass to provide a levelling and packing thereof as the form is progressively withdrawn from the accumulated mass sufficiently to provide free surface area within the form for additional mass accumulation.

7. Apparatus as defined in claim 6 wherein upon the progressive movement of said form beyond the mass at the cessation of in-flowing forage, said baffle member automatically returns by gravity to its original depending position.

8. Apparatus as defined in claim 6 including:
means hingedly connecting the respective sides to the respective longitudinal edges of said top, and
means mounted to said top and operatively connected to said respective sides for moving said sides on said hinge means whereby said sides can be laterally extended outwardly at the bottom a predetermined distance to present a form configuration having a flat top and downwardly and outwardly sloping sides.

9. Apparatus as defined in claim 8 including:
ground engaging wheels including a respective mounting means attaching a respective wheel to respective sides at opposed points thereon intermediate the front and rear thereof, and
means on said wheel mounting means to permit of wheel orientation of 90° away from a direction of forward movement whereby said wheels are functional in ground engagement at such time as said sides are being laterally extended.

10. Apparatus as defined in claim 8 wherein the means for moving said sides includes hydraulic cylinder assemblies adapted for operable connection to a source of hydraulic power.

* * * * *